United States Patent [19]

Kasahara

[11] Patent Number: 4,751,609
[45] Date of Patent: Jun. 14, 1988

[54] ELECTROSTATIC HOLDING APPARATUS
[75] Inventor: Keiji Kasahara, Kakegawa, Japan
[73] Assignee: Kabushiki Kaisha Abisare, Shizuoka
[21] Appl. No.: 84,447
[22] Filed: Aug. 12, 1987
[30] Foreign Application Priority Data Apr. 14, 1987 [JP] Japan .................. 62-089848

[51] Int. Cl.⁴ ............................. H05F 1/00
[52] U.S. Cl. .................................. 361/234
[58] Field of Search ............... 361/234; 250/492.2
[56] References Cited

U.S. PATENT DOCUMENTS 3,916,270 10/1985 Wachtler et al. ............. 361/234
4,184,188 1/1980 Briglia ........................ 361/234

FOREIGN PATENT DOCUMENTS 55-20830 6/1980 Japan .
57-58872 12/1982 Japan .

Primary Examiner—L. T. Hix
Assistant Examiner—Brian W. Brown
Attorney, Agent, or Firm—Flynn, Thiel, Boutell & Tanis

[57] ABSTRACT

An electrostatic holding apparatus having, in sequentially laminated relation, an insulating base layer, a set of electrodes to which positive and negative charges are respectively applied, and an adsorbing layer which is induced by the set of electrodes for attracting and holding an object thereagainst by an electrostatic attracting force. A power supply circuit is connected to the set of electrodes for respectively applying positive and negative charges to the first and second electrodes of the set. The power supply circuit includes a DC power source, and also includes a switching arrangement for permitting reversing of the charges as applied to the electrodes so that reverse charges are applied to the electrodes each time a prior object is peeled off the adsorbing layer and a new object is attached thereto.

2 Claims, 2 Drawing Sheets

ELECTROSTATIC HOLDING APPARATUS

FIELD OF THE INVENTION

The present invention relates to an electrostatic holding apparatus having, in sequentially laminated relationship, an insulating base layer, a set of electrodes to which positive and negative charges are respectively applied, and an adsorbing layer which is induced by the set of electrodes for holding an object by an electrostatic attracting force, whereby the object to be adsorbed can be stably held by a large attracting force.

BACKGROUND OF THE INVENTION

In a known electrostatic holding apparatus for attracting and holding an object to be adsorbed by use of the Coulomb force of static electricity, an insulating base layer, a set of electrodes, and an adsorbing layer are sequentially laminated. In such apparatus, positive and negative charges are respectively applied to the set of electrodes by conduction, and the adsorbing layer is induced, whereby an object to be adsorbed is adsorbed and held by the electrostatic attracting force of the adsorbing layer. Such electrostatic holding apparatus is disclosed in JP-B No. 55-20830 and JP-B 57-58872.

However, such conventional electrostatic holding apparatuses have a disadvantage in that, when the adsorbed object is peeled off or removed from the apparatus, the attracting force is weakened. Thus, when a further object is to be attached to the apparatus, there is a problem in that a sufficient attracting force may not be effected, and the object to be adsorbed may not be stably held.

It is, therefore, an object of the present invention to provide an improved electrostatic holding apparatus of this general type, which apparatus overcomes the above disadvantage.

To accomplish this object, according to the invention, there is provided an electrostatic holding apparatus having, sequentially laminated, an insulating base layer, a set of electrodes to which positive and negative charges are respectively applied by conduction, and an adsorbing layer which is induced by the set of electrodes and adsorbs and holds an object to be adsorbed by an electrostatic attracting force. This apparatus is characterized by providing a power supply circuit for respectively applying the opposite (i.e., reversing the) positive and negative charges to the set of electrodes after the object adsorbed and held to the adsorbing layer is peeled off so that a new object can be adsorbed and held by the apparatus.

According to the invention, after completion of the non-conduction state (that is, after removal of the object), the opposite positive and negative charges are respectively applied to the set of electrodes by the power supply circuit. Therefore, by setting the apparatus into the non-conducting state, the object held on the apparatus can be easily peeled off. On the other hand, by applying the opposite positive and negative charges after completion of the non-conduction state, a new object to be adsorbed is adsorbed and held by a large attracting force.

BRIEF DESCRIPTION OF THE DRAWINGS

An embodiment of the present invention will now be described in detail in conjunction with the accompanying drawings wherein.

DETAILED DESCRIPTION

Figure 1:
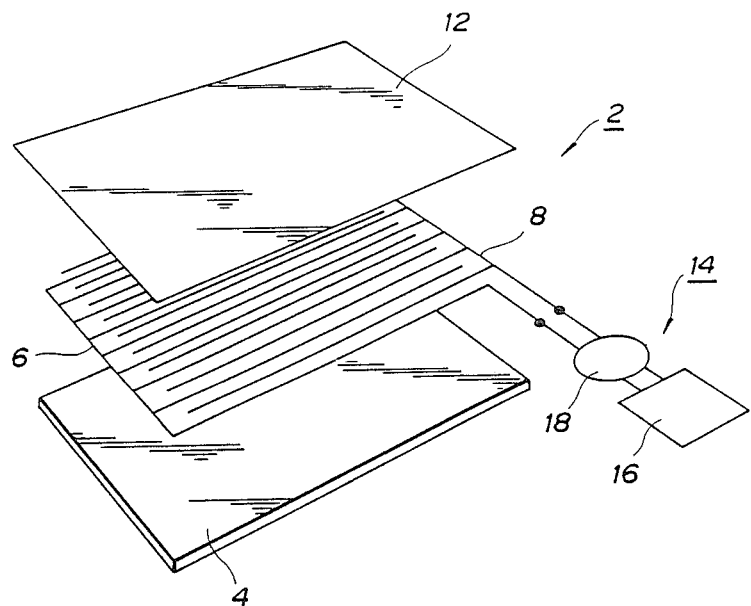
FIG. 1 is an exploded perspective view of the invention.
Figure 2:
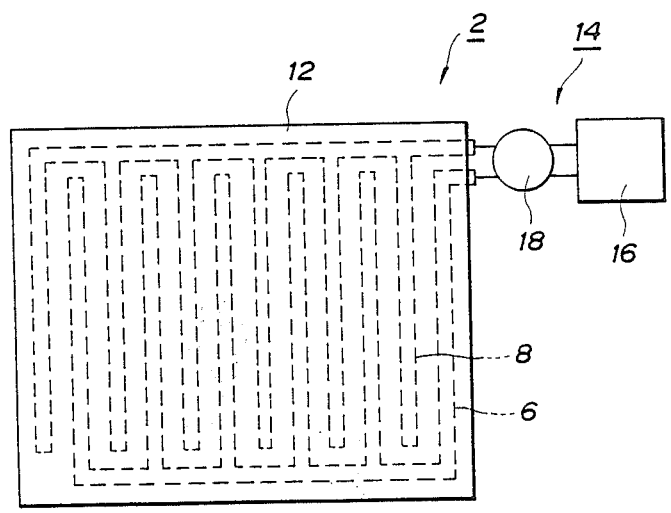
FIG. 2 is a plan view thereof.

FIGS. 1 to 4 show an embodiment of the invention. In FIGS. 1 and 2, an electrostatic holding apparatus 2 is constituted by sequentially laminating an insulating base layer 4, a set of electrodes 6 and 8 arranged like a comb to which positive and negative charges are respectively applied by conduction, and an adsorbing layer 12 which is induced by the set of electrodes 6 and 8 and adsorbs and holds an object 10 to be adsorbed by the electrostatic attracting force.

Figure 3:
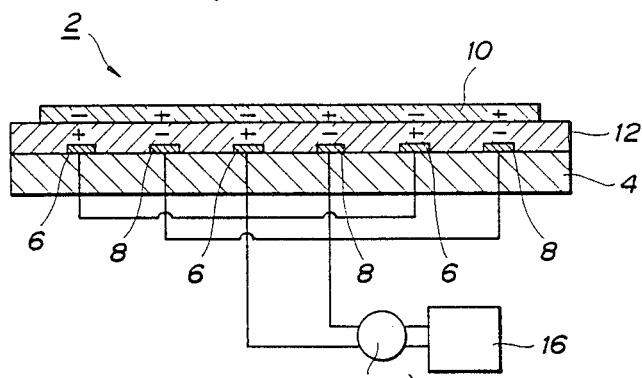
FIG. 3 is a cross-sectional view thereof.

As shown in FIG. 3, the electrostatic holding apparatus 2 has a DC power source 16 connected to the set of electrodes 6 and 8, thereby applying positive and negative charges, respectively. Since the adsorbing layer 12 is induced by the set of electrodes 6 and 8, when the object 10 comes into contact with layer 12, the charges of the polarity different from the charges of each of the electrodes 6 and 8 are generated by electrostatic induction in the portions of the object 10 which face the electrodes 6 and 8. Thus, an electrostatic attracting force acts between the charges caused in the object 10 and the charges of each of the electrodes 6 and 8, thereby adsorbing (i.e., attracting) and holding the object 10 to the surface of the adsorbing layer 12.

As described above, the electrostatic holding apparatus for adsorbing and holding the object 10 has an inconvenience in that, when one object 10 to be adsorbed is peeled off, the attracting force is weakened. Thus, there is a problem such that a sufficient attracting force may not be effected so that a further object 10 may not be stably held.

In this invention, there is provided a power supply circuit 14 for applying the opposite positive and negative charges to the set of electrodes 6 and 8 after completion of the non-conduction state when the first object 10 adsorbed and held to the adsorbing layer 12 is peeled off, and before a new object 10 is adsorbed and held. The power supply circuit 14 comprises: the power supply section 16 to supply a DC power source; and a change-over switch 18 for switching or reversing the DC power source of the power supply section 16 in order to apply the opposite positive and negative charges to the set of electrodes 6 and 8 after completion of the non-conduction state. Switch 18 can be manually actuated.

The material of the layer 12 is, for example, polyester or P.C. (polycarbonate) or A.B.S. (acrylonitrile butadiene styrene), or materials of similar properties. Object 10, on the other hand, typically comprises a thin sheet-like member such as a paper sheet, a film (as for an overhead projector), or the like.

The operation will now be explained.

The DC power source of the power supply section 16 is switched by the switch 18 and supplied to the set of electrodes 6 and 8. For example, as shown in FIG. 3, when the positive charges are applied to the electrode 6 and the negative charges are applied to the other electrode 8, the adsorbing layer 12 is induced. When a first object 10 comes into contact with the adsorbing layer 12, the charges of polarity different from that of the charges of the electrodes 6 and 8 are caused by electrostatic induction in the portions of the object 10 which face the electrodes 6 and 8. Thus, the electrostatic attracting force acts between the charges generated in the object 10 and the charges of the electrodes 6 and 8, thereby adsorbing and holding the object 10 to the surface of the adsorbing layer 12.

Figure 4:
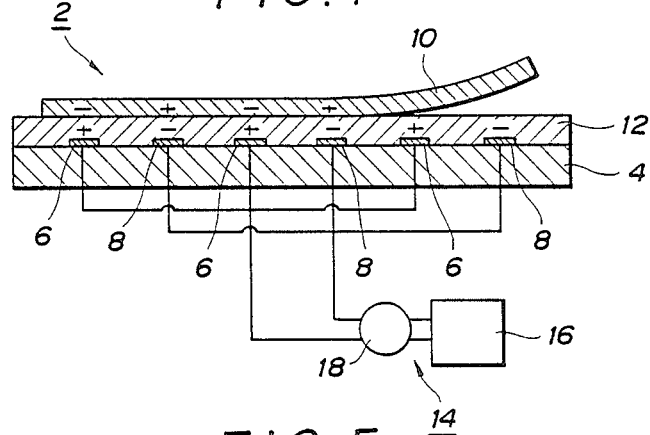
FIG. 4 is a cross-sectional view of a state in which an object to be adsorbed is peeled off.

As shown in FIG. 4, when this first object 10 as adsorbed and held to the adsorbing layer 12 is peeled off, the attracting force of the adsorbing layer 12 is slightly weakened. Therefore, when the first object 10 as adsorbed and held to the adsorbing layer 12 is peeled off, and a new object 10 is to be adsorbed and held, the DC power source of the power supply section 16 is switched by the change-over switch 18 so as to apply the opposite positive and negative charges to the set of electrodes 6 and 8 respectively, after completion of the non-conduction state.

Figure 5:
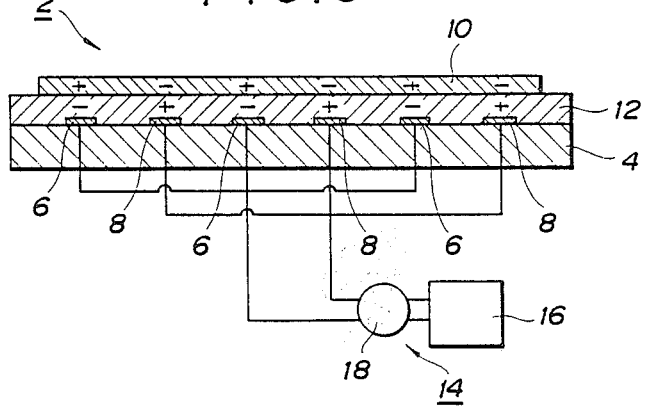
FIG. 5 is a cross-sectional view of a state in which a new object to be adsorbed is adsorbed.

In this manner, by setting the electrodes 6 and 8 into the non-conduction state, as by disrupting the supply of DC electrical power (such as moving switch 18 into an open position), the object 10 adsorbed and held to the adsorbing layer 12 can be easily peeled off. On the other hand, for example, as shown in FIG. 5, after the non-conduction state, the negative charges are applied to the electrode 6 and the positive charges are applied to the other electrode 8. Therefore, when the next object 10 comes into contact with the adsorbing layer 12, the charges of polarity different from that of the charges of each of the electrodes 6 and 8 are caused by electrostatic induction in the portions of the object 10 which face the electrodes 6 and 8. Thus, the electrostatic attracting force acts between the charges caused in the object 10 and the charges of the electrodes 6 and 8, thereby enabling the next object 10 to be adsorbed and held to the surface of the adsorbing layer 12 by a sufficient attracting force.

Thus, the object to be adsorbed can be stably held by the large attracting force.

As described above, according to the invention, the opposite positive and negative charges are respectively applied to the set of electrodes by the power supply circuit after completion of the non-conduction state. Thus, a first object can be easily peeled off by setting the set of electrodes into the non-conduction state. On the other hand, by applying the opposite positive and negative charges to the set of electrodes after completion of the non-conduction state, a new object to be adsorbed can be adsorbed and held by a large attracting force.

Due to this, it is possible to realize an electrostatic holding apparatus which can stably hold an object to be adsorbed by a large attracting force.

The embodiments of the invention in which an exclusive property or privilege is claimed are defined as follows:

1. In an electrostatic holding apparatus having, in sequentially laminated relation, an insulating base layer, a set of electrodes to which positive and negative charges are respectively applied by conduction, and an adsorbing layer which is induced by said set of electrodes and adsorbs and holds an object to be adsorbed by an electrostatic attracting force, the improvement comprising power supply circuit means connected to said set of electrodes for respectively applying opposite positive and negative charges to said set of electrodes after completion of a non-conduction state when a first said object as adsorbed and held to said adsorbing layer is peeled off and a second said object is adsorbed and held to said adsorbing layer.

2. An apparatus according to claim 1, wherein said power supply circuit means includes a DC power source having first and second terminals, and electrically conductive means connected between said first and second terminals and said set of electrodes, said conductive means including switching means for selectively permitting said first and second terminals to be alternately and oppositely connected to first and second electrodes of said set for alternately reversing the electrical polarity of the electrodes.

* * * * *